US012732419B2

(12) United States Patent
Girardin et al.

(10) Patent No.: US 12,732,419 B2
(45) Date of Patent: Sep. 8, 2026

(54) CROSS-VENDOR FABRIC OF 5G RESOURCES AND NETWORK SLICES

(71) Applicant: HEWLETT PACKARD ENTERPRISE DEVELOPMENT LP, Spring, TX (US)

(72) Inventors: Christophe Girardin, Mougins (FR); Sebastien Bouat, St Martin d'Uriage (FR); Nicolas Guerrodj, Grenoble (FR); Dominique Domet De Mont, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 421 days.

(21) Appl. No.: 18/359,200

(22) Filed: Jul. 26, 2023

(65) Prior Publication Data

US 2024/0364587 A1 Oct. 31, 2024

(30) Foreign Application Priority Data

Apr. 26, 2023 (EP) .................................... 23290011

(51) Int. Cl.
*H04L 41/0806* (2022.01)
*H04W 48/16* (2009.01)

(52) U.S. Cl.
CPC ......... *H04L 41/0806* (2013.01); *H04W 48/16* (2013.01)

(58) Field of Classification Search
CPC .......................... H04L 41/0806; H04W 48/16
See application file for complete search history.

(56) References Cited

U.S. PATENT DOCUMENTS

| | | | | |
|---|---|---|---|---|
| 2007/0055558 | A1* | 3/2007 | Shanahan | G06Q 10/06 705/7.26 |
| 2007/0288478 | A1* | 12/2007 | DiMaria | G06F 16/44 |
| 2020/0396148 | A1* | 12/2020 | Schibler | H04L 43/0817 |
| 2021/0127351 | A1* | 4/2021 | Stojanovski | H04W 48/16 |
| 2022/0225223 | A1* | 7/2022 | Huang | H04W 76/11 |
| 2024/0073092 | A1* | 2/2024 | Peuziat | H04L 41/0893 |
| 2025/0106110 | A1* | 3/2025 | Kumar | H04L 41/084 |

OTHER PUBLICATIONS

Hewlett Packard Enterprise Development, LP, "5G Integration, Operations in a Multivendor, Container-Based Architecture," Jul. 16, 2020, Business White Paper written by Strategy Analytics, HPE and Intel.

Brown, G., "Multi-Vendor 5G Core Networks: The Case for a Disaggregated Control Plane," Jul. 22, 2021, Oracle White Paper.

Nephio, Nephio: Cloud Native Network Automation>, retrieved on Nov. 13, 2025, 6 pages.

* cited by examiner

*Primary Examiner* — Fabricio R Murillo Garcia

(74) *Attorney, Agent, or Firm* — Hewlett Packard Enterprise Patent Department

(57) ABSTRACT

Systems and methods are provided for a cross-vendor fabric capable of deploying and managing network functions associated with different operating conditions or considerations. A cross-vendor fabric may deploy/manage components or groups of components making up a network function through the use of deployment-agnostic descriptors are used to define the components/groups of components, and from which deployment-specific descriptors can be derived. Begin and end states associated with the deployment-specific descriptors can be analyzed to determine a workflow of operations to be performed to accomplish the deployment or management of the network functions.

20 Claims, 7 Drawing Sheets

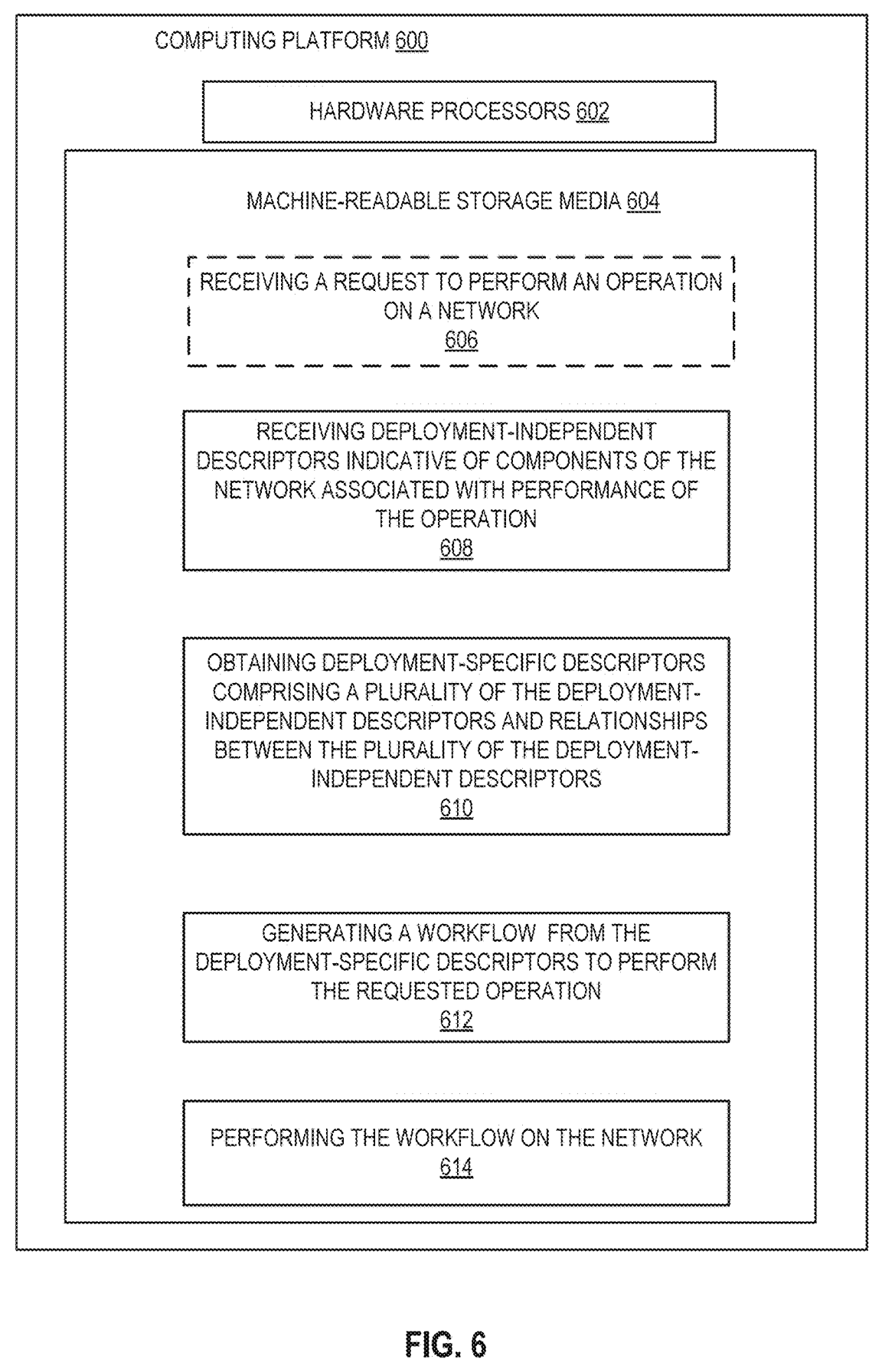

COMPUTING PLATFORM 600

HARDWARE PROCESSORS 602

MACHINE-READABLE STORAGE MEDIA 604

RECEIVING A REQUEST TO PERFORM AN OPERATION ON A NETWORK
606

RECEIVING DEPLOYMENT-INDEPENDENT DESCRIPTORS INDICATIVE OF COMPONENTS OF THE NETWORK ASSOCIATED WITH PERFORMANCE OF THE OPERATION
608

OBTAINING DEPLOYMENT-SPECIFIC DESCRIPTORS COMPRISING A PLURALITY OF THE DEPLOYMENT-INDEPENDENT DESCRIPTORS AND RELATIONSHIPS BETWEEN THE PLURALITY OF THE DEPLOYMENT-INDEPENDENT DESCRIPTORS
610

GENERATING A WORKFLOW FROM THE DEPLOYMENT-SPECIFIC DESCRIPTORS TO PERFORM THE REQUESTED OPERATION
612

PERFORMING THE WORKFLOW ON THE NETWORK
614

FIG. 6

CROSS-VENDOR FABRIC OF 5G RESOURCES AND NETWORK SLICES

BACKGROUND

Wireless devices (e.g., smart phones, tablets, and laptops) can be used to send and receive data. Such data may be transmitted and received over a wireless network. Wireless networks may be operated in accordance with various communications standards. The 5G standard is one such standard promulgated by the International Telecommunication Union (ITU) and the 3$^{rd}$ Generation Partnership Project (3GPP), with the ITU setting the minimum requirements for 5G compliance, and the 3GPP creating the corresponding specifications. The 5G standard is a successor to the 4G/Long Term Evolution (LTE) standard, and refers to the fifth generation of wireless broadband technology for digital cellular networks. The 5G standard is intended to replace or augment the 4G/LTE standard. Touted advantages of 5G include, e.g., exponentially faster data download and upload speeds, along with much-reduced latency (also referred to as "air latency," e.g., the time it takes for a device to communicate with the network).

The 5G standard introduces the concept of network slicing, which refers to the ability to create and operate multiple virtual networks, with each virtual network or network slice being dedicated or allocated to a specific use case (or customer). Accordingly, a 5G network can include multiple parallel virtual networks, each supporting a particular use case or delivering services to a subset of devices. Examples of devices can include, e.g., smart meters, connected vehicles, smart phones, industrial equipment, and/or any device capable of accessing a network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 is an example computing component that may be used to implement various features of network slice deployment in accordance with one example of the disclosed technology.

Figure 1:
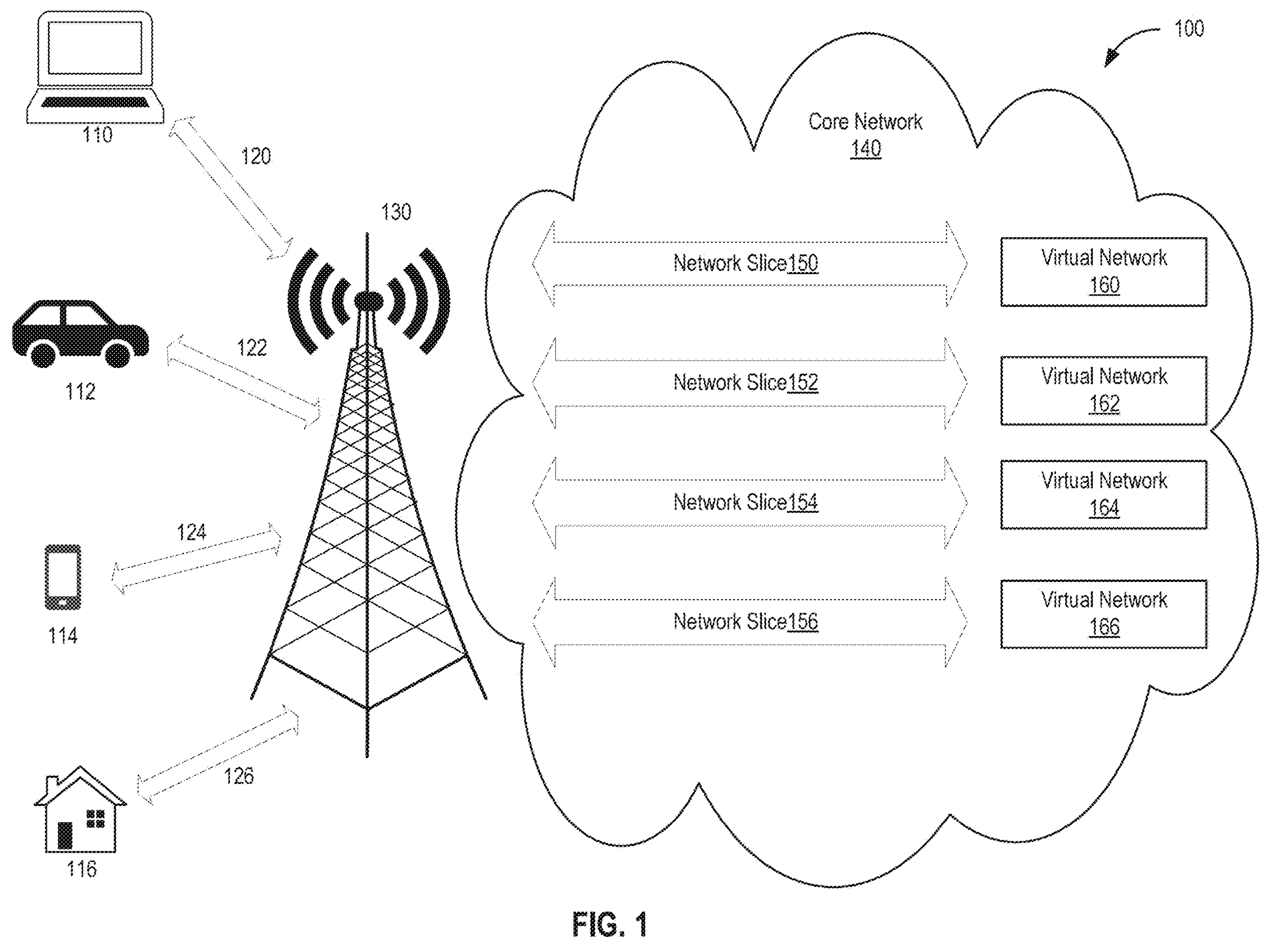
FIG. 1 illustrates an example network in which or with which various examples of the disclosed technology may be implemented

The figures are not exhaustive and do not limit the present disclosure to the precise form disclosed.

DETAILED DESCRIPTION

The telecommunications industry, including entities like communications service providers (CSPs), have embraced virtualization for deploying highly centralized, core network software-based equipment, i.e., network resources. However, compliance with the 5G standard can be problematic when using a virtualized approach to resource deployment. First, the 5G Service Base Architecture (SBA) promotes a breakdown of a mobile network's core into a number of micro-services, referred to as network functions (NFs). For example, a 5G core network (5GC) may include various NFs, such as a Core Access and Mobility Management Function (AMF) and a Session Management Function (SMF), both in communication with a Unified Data Manager (UDM). Unfortunately, such micro services are not easily implemented with virtual machines. Second, the 5G standard replaces the one-size-fits-all single network concept with, instead, specialized network instances dedicated to a certain type of traffic (e.g., video streaming, IoT, and so on), or for certain customers or types of customers (e.g., production factory, large account customers, etc.). These specialized instances, as noted above, are referred to as network slices. 5G network management can potentially involve thousands of network slices, where the network slices can run/execute in different places including on a customer's premises. Moreover, deployments in which network slicing is leveraged may have a distributed architecture, e.g., in the case of enterprise businesses, instead of one, more or less static, centralized, and monolithic network. Thus, deployments that operate using network slices warrant flexible and dynamic management mechanisms. This increased flexibility and dynamicity, together with the advantages associated with containerization, suggests a cloud-native infrastructure may be an appropriate architecture or platform for CSPs.

Kubernetes refers to a technology/software for automating deployment, scaling, and management of containers or containerized applications. Kubernetes supports various methods of deploying and handling the life-cycle of a software workload (software upgrade, configuration update, addition/removal of components, etc.). This support can apply to "low-level" resources or primitives such as Deployment, Service, and ConfigMap application programming interface (API) objects, as well as to higher-level abstractions, such as Helm charts or operators. Charts can refer to collections of files in a directory that describe a related set of (Kubernetes) resources, in other words, a script for managing package deployment in Kubernetes. Charts can be used to perform operations like deploy an application stack, for example. Operators refer to application-specific controllers that extend the functionality of a Kubernetes API to create, configure, and manage application instances. In other words, charts can handle the install-update-delete lifecycle of a containerized application, while operators can make use of custom resources to manage applications and their resources, with the intent to mimic what a human operator could do, automatically over an application's life cycle. In operation, operators/controllers execute loops to check the state of an application and a desired state, and act to reconcile the actual/desired states when they drift apart.

A 5G network slice typically comprises multiple NFs from multiple vendors, where each vendor may have particular methods for deploying particular configurations, prerequisites, conditions, and so on. The deployment/management of a network slice may further include the use of certain configuration technologies, along with, e.g., corresponding databases. For example, a network slice may rely on Netconf/Yang, which is one mechanism for configuring a network device, e.g., Yang refers to a modeling language that describes any configuration changes, while Netconf refers to a protocol that applies the changes to a relevant datastore on the network device. Indeed, managing the life-cycle of a software workload in a predictable way, with so many networks slices can be an extremely complex task.

Examples of the disclosed technology provide the ability to seamlessly deploy large number of NFs and network slices using a cross-vendor fabric. Such a cross-vendor fabric can be used to support the deployment of core network components, support Operating Support System (OSS) products that allow for the operation of such core network components, and provide life-cycle management. For example, the cross-vendor fabric can provide life-cycle management of, e.g., a 5GC network and slices made up of various network components. It should be noted that an OSS will typically support life-cycle management of a broader system that can include the 5GC network and network slices (which it delegates to the cross-vendor fabric), any telecom services implemented on top of the 5GC network/network slices, as well as provisioning subscribers making use of the 5GC network/slices. That is, some CSPs may use platforms or architectures that provide a catalog of ready-to-deploy network slice subnets that can be used to service customers, and that can be managed throughout respective life-cycles via a continuous integration/continuous deployment (CI/CD) pipeline for flexibly updating/replacing deployed NFs. Such platforms and architectures are able to provide predictable and agile deployment of NFs (relying on the cross-vendor fabric) atop a cloud native environment (both at the edge, and in regional, or in national data centers) for public and private 5G business cases. It should be noted that cloud-native environments or architectures refer to those environments/architectures that can allow for the designing, construction, or operation of workloads that are built in the cloud. Some such platforms and architectures can comprise a containerized infrastructure, i.e., utilize containerized NFs. The aforementioned cross-vendor fabric may be operable to aggregate equipment/resources from multiple vendors, while hiding any disparities (e.g., from one vendor to another) in the software technologies and processes used by different CSPs. The cross-vendor fabric exposes components through formal descriptors that can be instantiated and combined into a model representing the network to be deployed. In some examples, the cross-vendor fabric is further packaged as a Kubernetes operator, enabling seamless integration with a containerized infrastructure, or any other Kubernetes-aware system that can make use of such a cross-vendor fabric.

It should be noted that while the cross-vendor fabric allows for the co-existence of multiple, various vendors, it is not limited to that context. For example, a single vendor may be able to use different ways of configuring and operating its NFs, but the functionality of the cross-vendor fabric (described in greater detail below) still applies. That is, the cross-vendor fabric does not require that it be used only in a multi-vendor context. The co-existence of multiple vendors definitely favors the multiplication of different operating conditions or configurations, and highlights one value of the invention which is to expose everything in an uniform manner. That is, even in the presence of a single way of configuring and operating all the NFs in a deployment, the cross-vendor fabric remains valuable because of the descriptive model used for triggering any of the update/upgrade/addition/removal scenarios, instead of programming a dedicated workflow of operations.

Technical improvements are realized in accordance with examples of the disclosed technology. For example, orchestration can be accomplished with tools that are less complex and less resource-intensive, and avoid limitations of traditional tools with respect to the variety and complexity of NFs in a containerized environment. Moreover, the complexity typically associated with life-cycle management of software/applications can be hidden from the user. That is, the cross-vendor fabric described herein can achieve predictable and agile deployment of network slices/software/applications atop a cloud native environment, at the edge, in a particular region, in a national data center, etc, for both private and public use cases.

Before describing the details of the various examples contemplated herein, it would be beneficial to describe a network to which the aforementioned device may connect. FIG. 1 illustrates an example network 100 in which or with which various examples of the present disclosure may be implemented. A mobile network can be thought of as comprising two component networks, the radio access network (RAN) and the core network.

A mobile network's RAN may include various infrastructure, e.g., base stations/cell towers, masts, in-home/in-building infrastructure, and the like. The RAN allows users of mobile devices (also referred to as user equipment (UE), e.g., smartphones, tablet computers, laptops, vehicle-implemented communication devices (e.g., vehicles having vehicle-to-vehicle (V2V) capabilities), to connect to the core network. FIG. 1 illustrates a plurality of mobile devices using their respective RAN to connect to the core network via a 5G macro base station or macro cell, e.g., 5G macro cell 130.

Macro cells can refer to (tall, high-powered) "macro" base stations/cell towers that are able to maintain network signal strength across long/large distances. Macro cells, such as 5G macro cells, may use multiple input, multiple output (MIMO) antennas that may have various components that allow data to be sent and/or received simultaneously. In the example network 100 of FIG. 1, macro cell 130 may provide wireless broadband coverage/communications to devices, such as computer 110, vehicle 112, smartphone 114, and house 116. In some examples, a plurality of macro cells, like macro cell 130, may be used to provide broadband service to each of the different devices. Macro cells may also be used to provide broadband services to different areas, such as a city or municipality. The MIMO antennas used by macro cells may comprise large numbers of antenna elements, which can be referred to as massive MIMO, whose size may be comparable to, e.g., 3G and/or 4G base station antennas.

The core network may comprise the mobile exchange and data network used to manage the connections made to/from/via the RAN. The core network of network 100 may include a central server and a local server, not illustrated in FIG. 1. The central server may effectuate broadband service to a particular area by way of a particular macro cell, e.g., macro cell 130. The central server may also operatively connect to a local server, which in turn, provides broadband connectivity by way of other macro cells. The use of distributed servers, such as local servers, can improve response times, thereby reducing latency. The core network may leverage NF virtualization (instantiation of NFs using virtual machines via the cloud rather than hardware) and network slicing (segmentation of network 100 in accordance with a particular application, industry, or other criteria) to provide these lower response times, and provide faster connectivity. As alluded to above, micro services are not well-suited to virtual machine implementations. That is, and previously discussed, the micro service architecture involves breaking down a software system into a plurality of small components that typically consume small amounts of CPU/compute power and memory. Accordingly, implementing micro services with virtual machines results in wasted/trashed resources, because even the smallest of virtual machines (1 CPU and a few gigabytes of RAM) that may be used to host such micro services are typically too large. In contrast, containerization and technologies like Kubernetes allow for micro services to be hosted within a "pod" or pool of CPU resources that allow CPU power and memory configurations for the micro services to be decreased to, e.g., as far as 0.001 CPU and a few megabytes of RAM. Thus, hardware resource usage is more efficient.

As illustrated in FIG. 1, the core network of network 100 may be configured into multiple distinct virtual networks to allocate different resources to different types of services. Each virtual network, such as virtual networks 160, 162, 164 and 166, may be designated for a different industry to provide a particular service. Each virtual network 160, 162, 164, and 166 may be allocated with resources to fulfill specific network requirements of devices based on the industry/service sought, and each virtual network may be accessed through a different network slice, such as network slice 150, 152, 154, and 156. In one example, virtual network 160 may be tailored for entertainment video streaming and be accessed via network slice 150, virtual network 162 may be tailored for automotives and be accessed via network slice 152, virtual network 164 may be tailored for smartphones and be accessed via network slice 154, and virtual network 166 may be tailored for Internet of Things (IoT) devices and be accessed via network slice 156. Each of the devices of computer 110, vehicle 112, smartphone 114, and house 116 may be served by one or more of the network slices 150, 152, 154 and 156 to access one or more of the respective virtual networks 160, 162, 164 and 166. With the use of network slices and individual virtual networks, traffic flow may be managed between devices and resources may be allocated and better utilized to deliver tailored services to users of devices, which may ultimately provide better user experience.

With the advent of network slicing, as noted above, service provider/network operators or network slice tenants may define policies that control which devices are able to connect to specific network slices. Some network slices may be private (non-public networks), and for security reasons, access should be limited to a defined set of devices. This can arise in the context of, e.g., industrial IoT, manufacturing, smart city use cases, and the like. In accordance with current 5G standards, the right to connect to a network slice is linked to the identification and capabilities of the device, such as the subscriber profile, and the characteristics of the subscriber. Thus, devices that are not preconfigured with access to a particular network slice would be unable to connect to the particular network slice. This ultimately limits the efficiency of network slicing and the utilization of resources by permitting devices to access virtual networks that meet the specific network requirements being sought.

In the 5G context, and in particular for private slices, device access control should be performed on each access request to prevent unauthorized access. Performing such a check upon receipt of each access request would also allow the ECS to immediately detect use of a new device, and to trigger mandatory UE configuration activities before the device is allowed to connect to the requested slice. The UE configuration activities may be performed by one or more NFs in the communications network, and one or more of the NFs, such as the AMF, may send the UE configurations to the UE to allow the UE to connect to the requested slice.

Further still, according to the manner in which network slices are implemented in 5G, a device can request to connect to multiple network slices, e.g., up to eight network slices. Thus, device access control policies may be applied to each requested network slice, resulting in some network slices allowing access, while other network slices rejecting the requested access. At the end of the registration procedure, the AMF may return to the device, the subset of network slices that the device may use according to the network requirements in the request. Upon conclusion of the device registration procedure, the AMF can reply to the device with a list of the "allowed" network slices. However, the list of "allowed" network slices may not include a network slice that ultimately meets the network requirements needed by the device for a specific service since the list of "allowed" network slices is not generated based on the network requirements requested by the device. The list of "allowed" network slices may simply include all of the network slices that the device is preconfigured with authorization to access.

It should be understood that network slicing need not be limited to networks compliant with the 5G standard, e.g., other networks, known now or later-developed, may also utilize network slices or similar specialized network instances. Thus, although examples of the disclosed technology may be described in the context of the 5G standard/5G networks, examples of the disclosed technology are not limited for use/implementation in 5G systems/networks.

In some embodiments, a cross-vendor fabric may rely on descriptors for representing a system/network to be deployed, where descriptors can refer to an information element or declaration of information. Such descriptors may include component descriptors that characterize some component, e.g., an elementary, logical piece or aspect of software. For example, component descriptors may contain or include information regarding the component, such as its configuration parameters, its relationship with other components, the methods for configuring or deploying the component, etc.

Another type of descriptor that the cross-vendor fabric may rely upon are blend descriptors. In some examples, blend descriptors refer to descriptors that characterize an aggregation of two or more software components, or an aggregation of two or more blend descriptors. In some examples, both blend and component descriptors are specified/written once. Moreover, both blend and component descriptors are independent from or agnostic as to the nature or topology of any particular network/system deployment. That is, the information characterizing the components/blends does not contain or include information specific to any deployment.

Yet another type of descriptor utilized by the cross-vendor fabric are layout descriptors. In some examples, layout descriptors can comprise information/data for instantiating relevant components and component blends (characterized, as noted above, with corresponding component and blend descriptors).

Settings descriptors may also be relied upon by the cross-vendor fabric. As noted above, component and blend descriptors describe components and blends in a deployment-agnostic/deployment-independent manner (not reliant on deployment characteristics or constraints/needs, as noted above). The settings descriptors may then provide the requisite information/characteristics that configure the component and blend instances that are defined by an appropriate layout descriptor(s). It should be understood that the layout and settings descriptors are specific to a customer or deployment, i.e., deployment-specific, and take into account, deployment-specific considerations associated with or relevant to the deployment-independent/agnostic component/blend descriptors.

Figure 2:
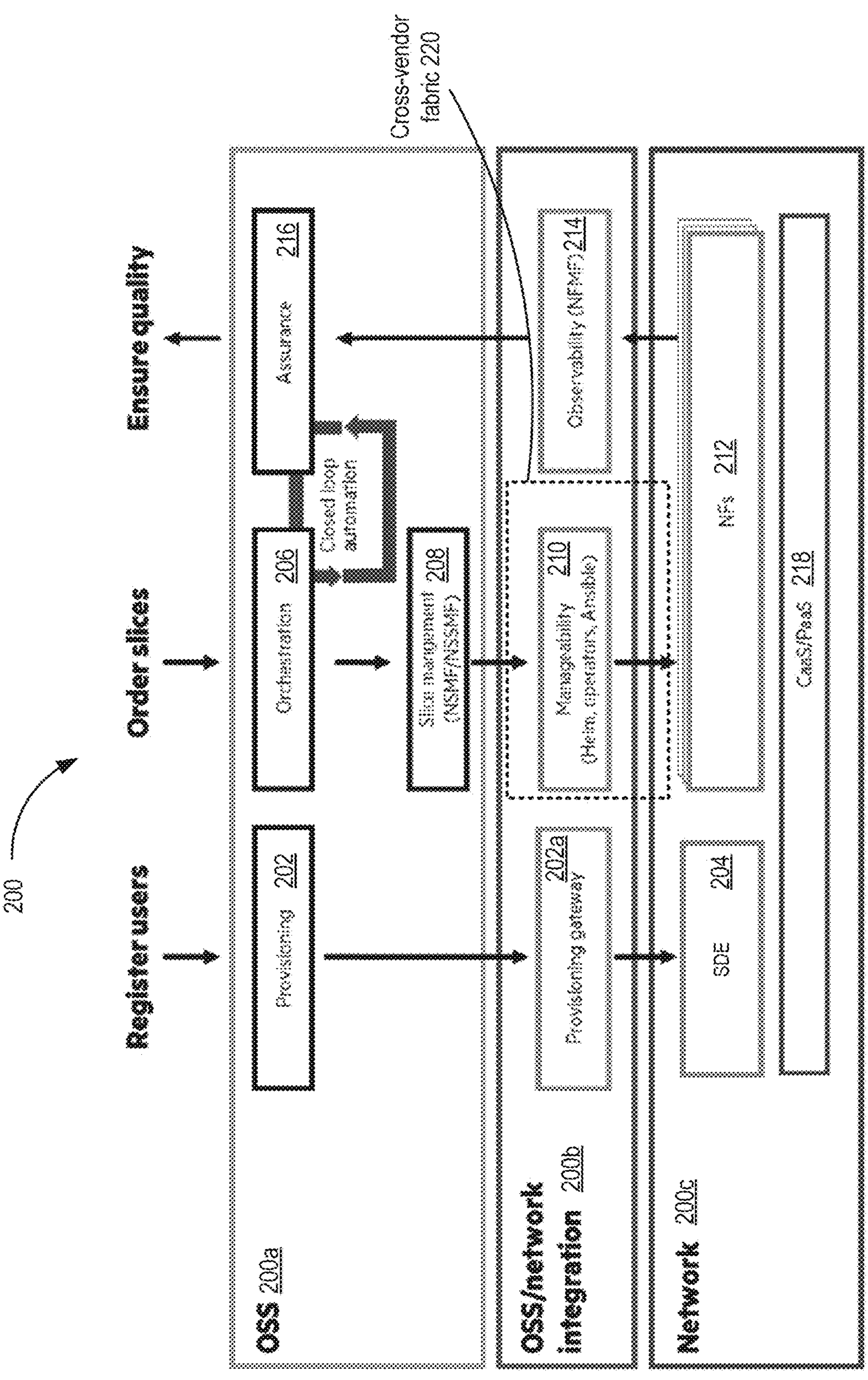
FIG. 2 illustrates an example data center having a layered architecture in which examples of the disclosed technology may be leveraged.

As noted above, some CSPs may use platforms or architectures that provide network slice subnets that can be used to service customers, and that can be managed throughout respective life-cycles via a continuous integration/continuous deployment (CI/CD) pipeline. Such architectures and platforms, as also noted above, can be implemented as cloud-native environments or architectures. FIG. 2 illustrates an example of such an architecture 200, that is representative of a CSP data center. It should be understood that the functionalities/functional components illustrated/described herein can refer to one or more logical or physical elements of architecture 200 that can deliver certain capabilities or functions.

Architecture 200 may comprise an operational support systems (OSS) "layer" 200*a* that can include provisioning interface 202, orchestration component 206, and assurance component 216, along with slice management component 208. In the context of a CSP data center, provisioning may comprise registering users to receive service, also referred to as service fulfillment. That is, provisioning interface 202 can operatively connect users with provisioning gateway 202*a*, (which perform various activities associated with assembling and making services available to subscribers of a CSP), e.g., registering subscriber data into a unified data repository (UDR) for a network such as a 5G network. Oftentimes, these activities make up an operational infrastructure whose efficiency relies on the ability of a CSP to match the supply of services with demand while maintaining service quality and reliability.

Orchestration component 206 is operative to coordinate operations or changes within architecture 200 for the creation of communication services or products that are provided to users, e.g., subscribers. For example, orchestration component 206 can provide a desired NF virtualization by determining how to orchestrate or coordinate the resources that are to be utilized to achieve the desired NF virtualization. Assurance component 216 can apply policies and processes of the CSP to ensure that services offered over a communications network meets some pre-defined service quality for a positive subscriber experience. For example, CSPs may endeavor to provide a particular service(s) that experience some minimum threshold of downtime, that provide some action(s) within a specified amount of time, that meet or exceed customer satisfaction expectations, etc.

In the illustrated example of FIG. 2, a closed loop automation indication is shown between orchestration component 206 and assurance component 216. In this example, closed loop automation can refer to a process by which: (1) a fulfillment request is received (in this case, perhaps requesting a network slice); (2) an action(s) is executed to fulfill the requirements of the fulfillment request; (3) monitoring services (which may be the object of the fulfillment request, the action(s) executed to fulfill the requirements of the fulfillment request, and/or some underlying operation(s)/product(s) impacted by the fulfillment request in some way) to ensure the services operate as desired/intended/creased; (4) correlating events that result from the monitoring of the services to the proper services; (5) computing the effects and actions for the events related to the monitored services; (6) determining manual and/or automated actions to test and remediate affected services; and (7) executing the manual and/or automated actions as fulfillment requests.

Slice management component 208 can refer to one or more functions for creating/deleting network slices, such as network slice management function (NSMF), which deals with an end-to-end slice, and a network slice subnet management function (NSSMF) which deals with the underlying network, in this example, network 200*c*. A typical life cycle management process can entail the following: (1) design and preparation of a network slice template; (2) instantiation request to create, configure, and activate a network slice; monitoring and controlling of the network slice to meet quality-of-service (QOS) requirements; and deactivation of the network slice once the network slice is no longer of use. Accordingly, slice management component 208 may transmit interactions (request/response, subscribe/notify notifications) to different users or to underlying network management systems. Because network slicing can occur across multiple domains, network slicing has implications down to the resource level to ensure proper traffic isolation, bandwidth, or latency. Network slice management should encompass efficient, programmatic end-to-end orchestration (vis-à-vis orchestration component 206), with closed-loop automation across fulfillment, inventory updates and service assurance (vis-à-vis assurance component 216).

Architecture 200 may further comprise an OSS/network integration layer 200*b* that can include the aforementioned provisioning gateway component 202*a*, manageability component 210, as well as an observability component 214. Manageability component 210 may be embodied by cross-vendor fabric 220 (discussed in greater detail below). Manageability component 210 can include the aforementioned Helm charts and operators. It should be noted that the life-cycle of a software component is typically managed using either Helm charts or operators. An operator is a more powerful/flexible option as it can address various use-cases (installation, configuration/re-configuration, upgrades, backups, etc.), and automatically relying only on some custom resources. Helm charts typically offer fewer functionalities, and do not run automatically, but rather, are triggered, typically by some "external" system such as cross-vendor fabric 220. This is in contrast to operators which are a native Kubernetes resource, and thus, "internal" to a Kubernetes cluster. Manageability component 210 may also include various software tools that enable infrastructure as code for provisioning, configuration management, and application deployment, such as Ansible. Observability component 214 may operate to expose information regarding state(s) of orchestration, automation, network resources, and running services across network slices. It should be noted that observability can help to ensure that the same tools can be used consistently across different NFs regardless of vendor (via the cross-vendor fabric).

Architecture 200 additionally may include a network layer 200*c* that comprises a shared data environment (SDE) 204, NFs 212 (which can be any NFs as already discussed above), and underlying container-as-a-service (CaaS)/platform-as-a-service (PaaS) tools 218. SDE 204 comprises an architecture with a data processing layer (which provides integration functionality/interfaces to the outside world), and a database layer based on a distributed data grid (that consolidates subscriber/user data, and separates provisioning/maintenance of that data from any front-end applications, while also storing session/state information associated with such front-end applications. The database layer may comprise a hybrid storage memory data grid and persistent storage. In this way, and again, by virtue of the cross-vendor fabric, SDE 204 allows data storage to be separated from any data processing, and allows network 200*c* to share session/state data across different service types and network slices. CaaS/PaaS tools 218 can provide data (to be collected by observability component 214) from various containers or other cloud resources. Observability component 214 may then aggregate and normalize data at the NF level, thereby providing an abstraction (based on descriptors) that can ultimately be mapped to services and objects defined by/managed as the OSS layer or level 200*a*.

Figure 3:
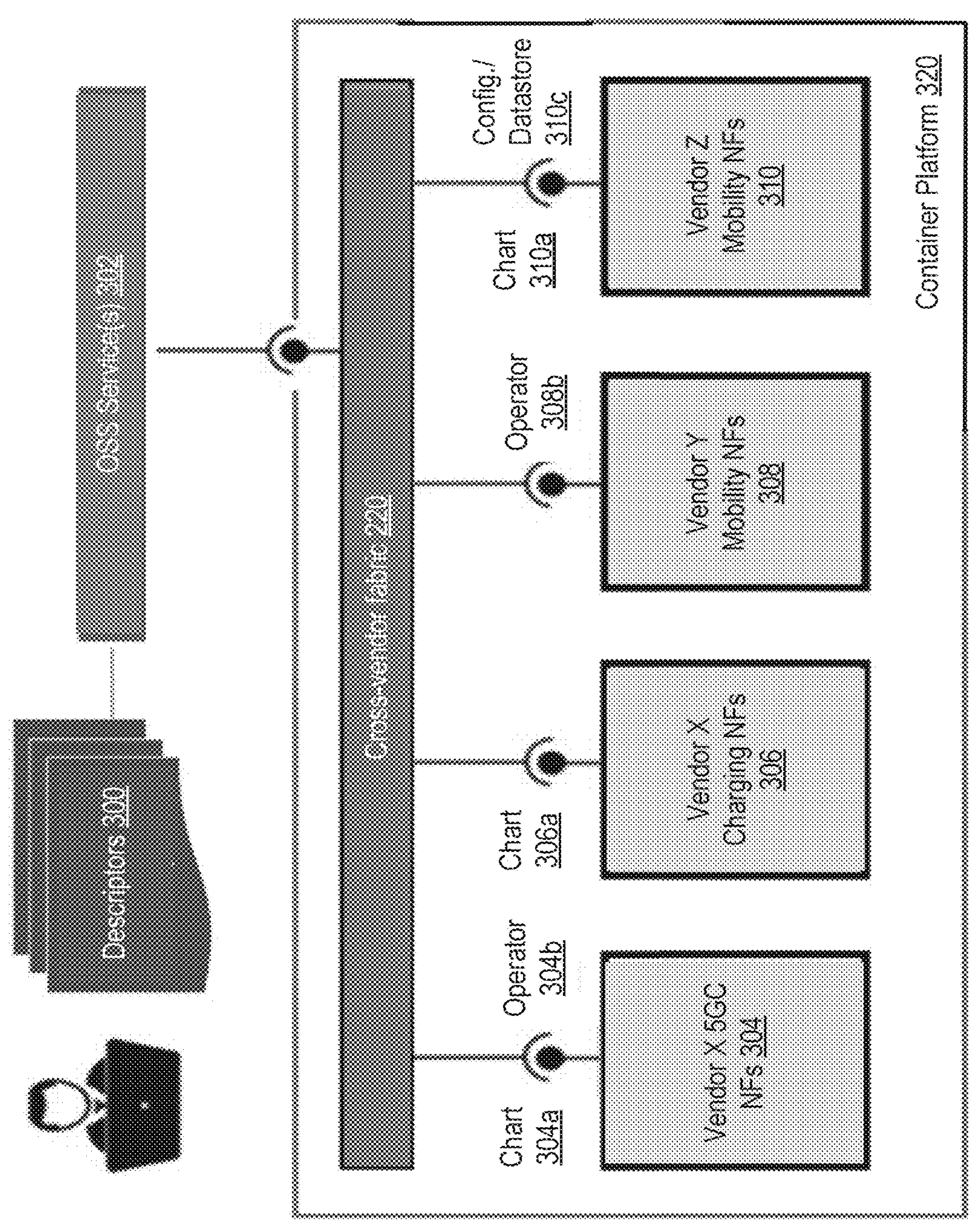
FIG. 3 illustrates an example architecture or platform for service/software deployment using a cross-vendor fabric in accordance with examples of the disclosed technology.

FIG. 3 illustrates an example architecture for service or software deployment using a cross-vendor fabric, such as cross-vendor fabric 220, in accordance with examples of the disclosed technology. Briefly referring back to FIG. 2, as discussed above, cross-vendor fabric 220 enables disparate NFs to be used/managed to effectuate a service/software deployment, where cross-vendor fabric 220 operates between layers such as OSS layer 200*a* (where services are delivered/effectuated) and the NFs, e.g., NFs 212, themselves, at the network, e.g., network 200*c*, level. FIG. 3 focuses on the interaction between descriptors, services, and NFs made possible by cross-vendor fabric 220.

It should be understood that application containerization can refer to a virtualization method for deploying and executing distributed applications without launching an entire virtual machine (and recalling that virtual machines are typically too large for running micro services/NFs, resulting in wasted resources) for each such application, and without bundling a copy of the OS. That is, multiple applications/services can run on, e.g., a single host, and typically access the same operating system (OS) kernel. Containers can be implemented on bare-metal systems, virtual machines, or cloud instances. A container may be defined as an executable package of software code, and libraries/dependencies for running the software code (e.g., OS libraries/dependencies). However, containerized applications can be thought of as being isolated in that they do not bundle is (as part of the package), a copy of an OS. Rather, a runtime engine, such as Docker, installed on a host can be shared with containers. Thus, container platform 320 can be defined as a cloud-based environment on which containerized applications can be built, deployed, operated, and scaled. Container platform 320 may run on a set of virtual machines or bare metal services, and may hold any number of nodes that run containerized applications.

Use of the above-described descriptors allows for modeling a 5G core network along with the flexible nature of 5G-related technologies in accordance with a particular hierarchy. That hierarchy comprises network slices that contain NFs, where the NFs themselves rely on some general-purpose resources provided by the Kubernetes ecosystem, such as databases, message queues, centralized logging or network tracing, etc., referred to as backing services. Whereas "simpler" NFs and backing services may be typically modeled in or by component descriptors, more complex NFs, for instance those responsible for storing subscriber data, database embedding, etc. can be represented by blend descriptors. OSS orchestration component 206, as alluded to above, typically manages a broad system, one sub-system of which, is the 5GC network. Orchestration component 206 can generate descriptors that are consumed by cross-vendor fabric 220, in particular, layout and settings descriptors. Blend and component descriptors, however, are typically already provisioned as-is into cross-vendor fabric 220.

For example, container platform 320 may include cross-vendor fabric 220, along with various NFs that may comprise NFs from different vendors, NFs that effectuate different functionalities, and so on. In the example of FIG. 3, 5G core (5GC) NFs 304, such as a 5G core network UDM function NF, a unified data repository (UDR) function NF, an authentication server function NF, an unstructured data storage function NF, etc. may be associated with a particular vendor, e.g., vendor X. Container platform 320 may further include other NFs, such as Vendor X's charging function (CHF) NFs, and policy control function (PCF) NFs to support 5G charging functionalities, such as data flow detection, gating, etc. Still other NFs may include, e.g., mobility management functions, such as AMF/SMF NFs, as well as NFs, such as network repository function (NRF) NFs, and user plane function (UPF) NFs. For example, a first set of mobility NFs can be vendor Y NFs 308 (NFs specific to vendor Y that have certain characteristics promulgated by vendor Y, etc.). Similarly, a second set of mobility NFs can be vendor Z NFs 310. In some examples, vendor Y's and vendor Z's NFs are the same, but can be different.

Cross-vendor fabric 220 is primarily capable of managing the life-cycle of a complete 5GC network, and associated network slices. Of course, this may include managing the life-cycle of any individual NF and of any components falling under the NF (e.g., when NF X is deployed, NF Y must be updated). The life-cycle of an individual NF can be managed directly by cross-vendor fabric 220, or in some examples, management can be delegated fully or partially to a Helm chart or operator (or other tool) as specified/delivered for use by an NF vendor on a case-by-case basis. This can be based on a begin state/end state pattern, where the cross-vendor fabric is able to compute a gap between the begin and end states. As the set of operations to be performed progress from a begin state represented with/by a first pair of layout and settings descriptors, to an end state represented with/by a second pair of such layout and settings descriptors. For example, an empty begin state may correspond with an initial deployment of the software, whereas an empty end state may correspond with the software's "undeployment." That is, descriptors with "empty" values corresponding to certain parameters can suggest beginning and end states. Other combinations of states may define a change(s) in a currently deployed network or system.

Thus, descriptors 300, such as the aforementioned component/blend descriptors for describing an NF, can be genericized descriptions of NFs to be integrated or implemented in an application container. Again, descriptors such as component descriptors need not include "deployment-specific" details. For example, 5GC descriptors 300 may be presented, set forth, or otherwise provided as a catalog of generic or non-deployment-specific NF descriptors that describe configuration parameters, or an NF's relationship to/with other NFs, and so on. OSS services 302 may be an embodiment of OSS layer 200*a* (FIG. 2), and may include CI/CD or orchestration services that may specify how NFs are to be instantiated, integrated, monitored, updated, etc. in an application container.

Descriptors 300 may further include layout or settings descriptors. As noted above, layout descriptors can comprise information/data for instantiating relevant components and component blends. Settings descriptors may provide the requisite information/characteristics that configure the component and blend instances that are defined by an appropriate layout descriptor(s). For example, descriptors 300 may include generic AMF, UDM, UDR, etc. descriptors that can be selected to be implemented or integrated in a particular application container. That is, a CSP may desire to implement a network slice dedicated to a particular user or tenant of that CSP's communications network, e.g., a 5G network. Certain functionalities of a 5G network to be implemented, such as mobility management, in which case, an AMF NF for managing handovers should be deployed as part of the network slice. However, that same network slice should have implemented thereon, a charging functionality (CF) NF related to handovers that may be provided by a different entity than that which will be providing the AMF NF.

As noted above, OSS layer 200*a* provides services, such as orchestration, CI/CD, etc., and may interface with cross-vendor fabric 220 for deploying a system/software into a target Kubernetes cluster. It should be understood that typically, CI/CD and orchestration services generate the layout and setting descriptors (or a file comprising layout and settings descriptors) from a higher-level model of a system that includes 5G NFs. For example, orchestration component 206 may handle the deployment of a service comprising a software application that executes outside of the 5GC network, along with certain 5G NFs for handling telecommunications traffic. Orchestration by orchestration component 206 may further involve handling tasks such as subscriber provisioning, testing a deployed service (including the 5G NFs). When deploying the 5G NFs, orchestration component 206 may generate the appropriate layout and settings descriptors, and delegates actual deployment to cross-vendor fabric 220.

An advantage of the disclosed technology compared to conventional systems and methods is that a user (either a human user or functional component, e.g., orchestration component 206), is provided (and benefits) from a single and homogeneous interface with layout and settings that can hide the disparity/any differences between underlying NFs from various vendors using different deployment technologies. Further, this interface is purely descriptive ("what" is desired) and relieves the user from thinking about "how" to achieve it. Moreover, not only can cross-vendor fabric 220 address the initial deployment of the 5GC network, but it can also address all the subsequent phases of the life-cycle of the system, such as upgrading software, modifying configuration, or adding/removing components. This is accomplished by still, only using the same, purely descriptive interface based on layout and settings descriptors.

Cross-vendor fabric 220, as will be described below, can generate an appropriate workflow for performing deployment of the network slice accordance with the desired/requisite NFs. As also noted above, the use of charts, operators, as well as configuration mechanism, datastores, etc. typically supported by Kubernetes are supported by examples of the disclosed technology as well. It should be noted that although examples of the disclosed technology are described in the context of Kubernetes, examples may be adapted for utilization with other infrastructure management systems (Kubernetes is an open-source container orchestration system for automating software deployment, scaling, and management). In accordance with the example illustrated in FIG. 3, Vendor X's 5GC NFs 304 may be operated/deployed managed by chart 304*a* and operator 304*b*. Vendor X's charging NFs 306 may be managed by chart 306*a*, while vendor Y's NFs 308 may be deployed using operator 308*b*, and operation/deployment in accordance with a particular configuration of vendor Z NFs 310 may be controlled by chart 310*a* and configuration/datastore 310*c*. It should be understood that charts and operators may be used to different purposes or for similar purposes in different contexts depending on a vendor's needs/desires. For example, chart 306*a* may package vendor Y's VFs 308, e.g., as a YAML file, that can be deployed on a Kubernetes cluster, while operator 308*b* may be leveraged for more complex deployment operations, e.g., using custom resources. Vendor Z's NFs 310 may necessitate configuration/datastore functionality (such as the aforementioned Netconf/Yang mechanism. Despite such NFs having different needs, involve the use of different functions, etc., cross-vendor fabric 220 can realize such specific implementations based on the genericized or CI/CD/Orchestration-customized descriptors.

Implementing the cross-vendor fabric 220 as a Kubernetes operator enables cross-vendor fabric 220 to be seamlessly integrated (as just another operator as described herein) with the containerized nature of infrastructure/architecture 200, or any other Kubernetes-aware system. The model-driven approach (through descriptors) works well with/supports the operator paradigm. Moreover, cross-vendor fabric 220, in addressing all the subsequent phases of the life-cycle of the system/software, results in hiding life-cycle management complexity from the user. That said, cross-vendor fabric 220 can be implemented as, e.g., a self-contained service which runs either inside or outside a Kubernetes cluster.

Figure 4:
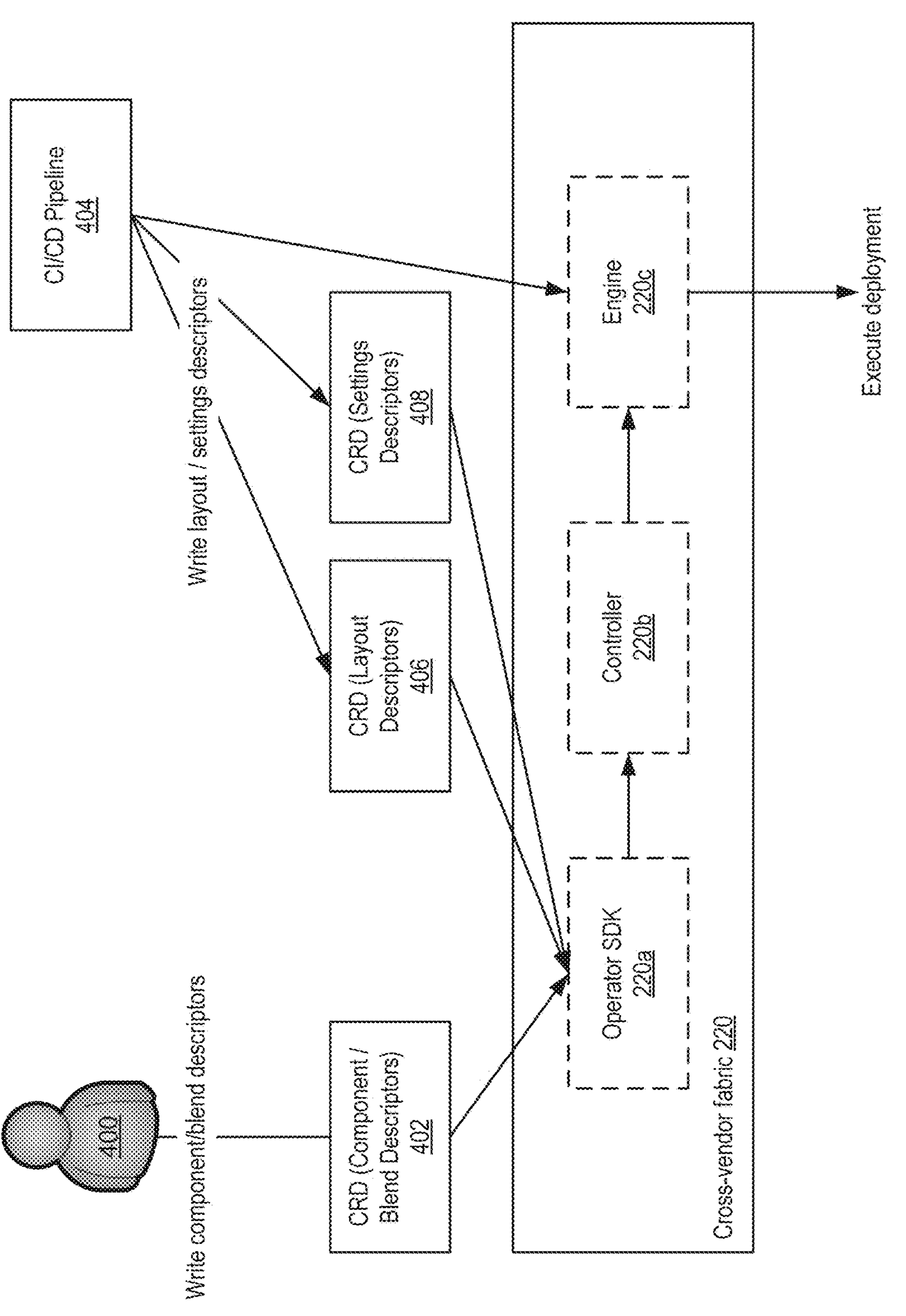
FIG. 4 illustrates components of a cross-vendor fabric in accordance with examples of the disclosed technology in relation to the example architecture of FIG. 3.

Operative aspects of cross-vendor fabric 220 are illustrated in FIG. 4. As noted above, cross-vendor fabric 220 may be implemented as an operator. Cross-vendor fabric 220 may be written in, e.g., Java software, and may be thought of as comprising an operator software development kit (SDK) 220*a*, a controller component 220*b*, and an engine component 220*c*. Thus, descriptors, as Kubernetes custom resources (CRs) (typically YAML documents) are put onto the Kubernetes cluster, and consumed by cross-vendor fabric 220 through operator SDK 220*a*. In some examples, when cross-vendor fabric 220 is implemented as a self-contained service, cross-vendor fabric 200 exposes a REST API for pushing relevant descriptors (typically triggered by a Jenkins CI/CD pipeline). Operators require that the structure of descriptors (written by a user, e.g., user 400, or generated by a CI/CD pipeline 404 of a CSP platform for operationalizing NFs) may be formalized into Custom Resource Descriptors (CRDs) for use by operators, such as cross-vendor fabric 220. In some examples, this can be accomplished automatically from Java code parsing the descriptors. The actual descriptors (component/blend descriptors 402, layout descriptors 406, and settings descriptors 408) are CRD instances referred as Custom Resources (CRs) and are typically written in YAML. Again, layout descriptors 406 may hold/comprise data describing blend instances that are to be deployed, and the relationship between the blend instances (e.g., an enhanced mobile broadband (eMBB) subnet instance may be related to a common subnet instance), while settings descriptors may hold/comprise settings/data for a layout (as defined in components/blends descriptors). Operator SDK 220*a* is informed when any of the aforementioned descriptors is modified, added or removed. Thus, operator SDK 220*a* can be leveraged to determine when the end-state changes, and to trigger cross-vendor fabric 220 to determine a workflow and execute a deployment. In particular, controller 220*b* computes the workflow of Kubernetes operations to be executed to perform a requested operation, and engine component 220*c* runs this workflow. Controller component 220*b* may implement diff logic/algorithm that allows controller component 220*b* to identify the gap between begin and end states (as alluded to above). Using a graph traversal algorithm, controller component 220*b* may then determine what workflow of operations are to be performed to go from a begin to an end-state. This workflow, as a sequence of bulks comprised with parallel operations can then be executed by engine component 220*c*. Thus, engine component 220*c* handles the portion of the cross-vendor fabric 220 interface that faces node clusters, which includes abstracting the way requested resources are packaged (as native objects, Helm charts or operators) and checking they were successfully created.

Figure 5:
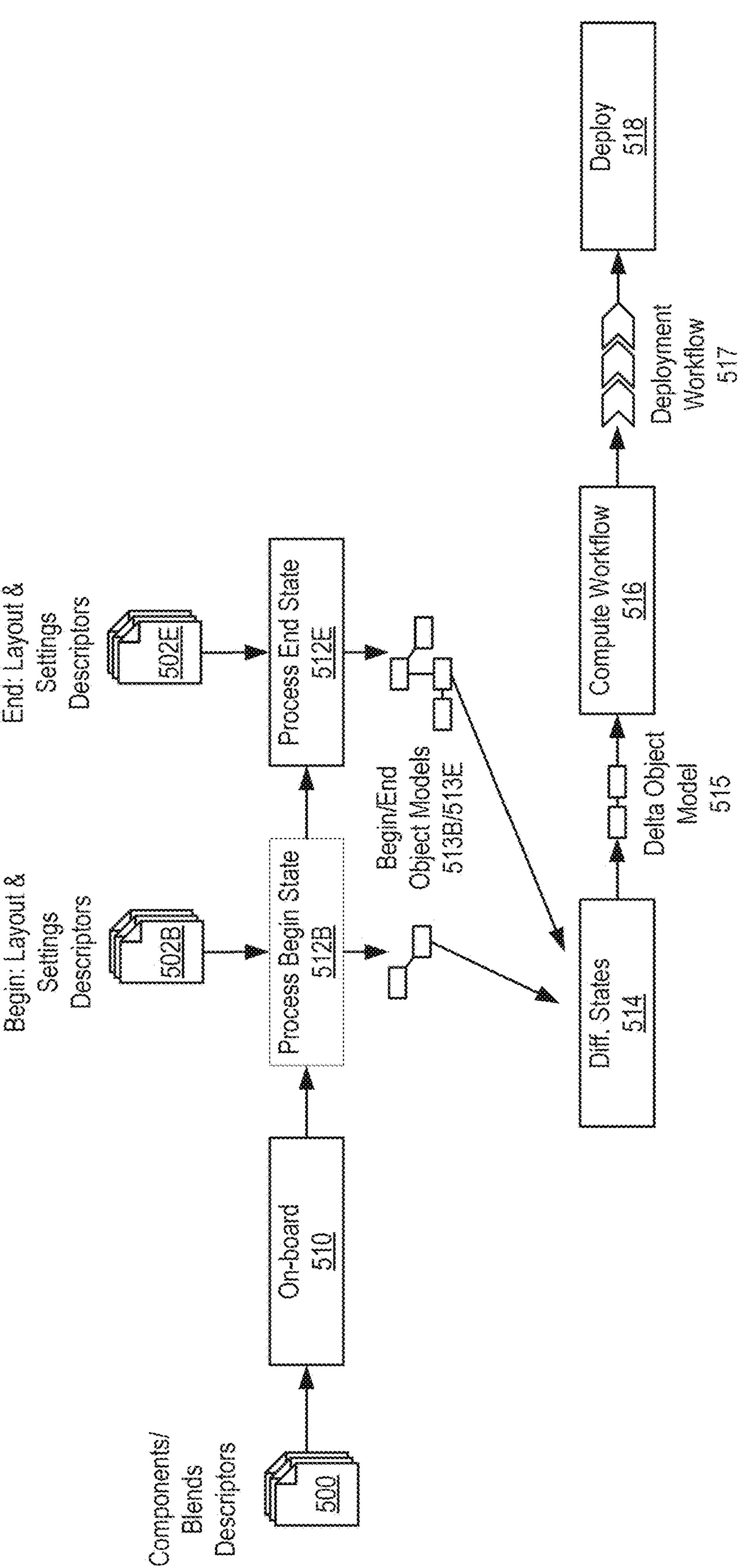
FIG. 5 is a flow chart illustrating example operations performed by a CSP platform to deploy a network slice using a cross-vendor fabric in accordance with examples of the disclosed technology.

FIG. 5 illustrates a flow chart illustrating example operations that may be performed to deploy a network slice(s) in accordance with one example of the disclosed technology. It should be noted that in some examples, onboarding (at 510), and inputting of descriptors 502B and 502E can be performed by a CSP (i.e., components or users thereof) or orchestration component 206 or by the CI/CD pipeline 404, while the remaining operations can be performed by cross-vendor fabric 220. The operations performed by cross-vendor fabric 220 are transparent to the CSP. As described above, a user and a CI/CD pipeline may specify or write component and blend descriptors 500, and generate layout and settings descriptors 502B/502E, respectively. The various descriptors 500, 502B, 502E can be used to define resources/resource-usage along with deployment-specific configurations, and the like. A cross-vendor fabric, e.g., cross-vendor fabric 220, can be used to support the deployment of core network components for use with the network slice(s), support OSS products that allow for the operation of such core network components, and provide life-cycle management. Again, some CSPs may use platforms or architectures that provide a catalog of ready-to-deploy network slice subnets that can be used to service customers, and that can be managed throughout respective life-cycles via a CI/CD pipeline for flexibly updating/replacing deployed NFs. Such descriptors 500 may be on-boarded at operation 510. Onboarding in this context can refer to providing the component and blend descriptors 500 to cross-vendor fabric 220 as inputs.

As described above, the layout and settings descriptors 502B/502E may be generated by the CI/CD pipeline of a CSP platform, such as CSP platform 200, and like the component and blend descriptors 500, may be input to cross-vendor fabric 220. In particular, and after normalization to CR instances, the controller component 220*b* may compute a workflow (of operations) 516 to be performed. Recalling that operator SDK 220*a* monitors and is aware of any modification, addition, or removal of such descriptors, the beginning and end states can be determined and the gap/difference therebetween can be determined. As illustrated in FIG. 5, a begin state can be processed at 512B. That is, controller component 220*b* may create an object representation of the software system, e.g., network slice(s), to be deployed that is based on component/blend descriptors previously on-boarded to cross-vendor fabric 220. That is, controller component 220*b* may create begin state object model 513B. At operation 512B, controller component 220*b* may also validate or confirm that configuration parameter values defined in settings descriptors match those described in component/blend descriptors, i.e., with respect to, e.g., name, type, constraints, requirements/requisites, etc., Such are characteristics of a configuration parameter that indicates whether the configuration parameter to be mandatorily, optionally, or conditionally set, e.g., "parameter X must be set if parameter Y value is greater than 10." In this way, the begin state of the software/network slice to be deployed can be determined.

As also illustrated in FIG. 5, an end state can be processed at 512E. Similar to begin state processing at 512B, controller component 220*b* may create an object representation of the software system, e.g., network slice(s), to be deployed that is based on component/blend descriptors previously on-boarded to cross-vendor fabric 220. That is, controller component 220*b* may create end state object model 513E. At operation 512E, controller component 220*b* may validate or confirm that configuration parameter values defined in settings descriptors match those described in component/blend descriptors, i.e., with respect to, e.g., name, type, constraints, requirements/requisite operations, etc.). In this way, the end state of the software/network slice to be deployed can be determined.

Controller component 220*b*, at 514, identifies the gaps or differential between the object model matching the begin state and the object model matching the end state using, e.g., some type of diff algorithm. It should be noted that diff algorithms are known and understood by those of ordinary skill in the art for outputting a set of differences (gaps) between two inputs (begin and end states). The diff algorithm may compute these gaps based on the set of component descriptors on-boarded to cross-vendor fabric 220, and the values corresponding to the component descriptor configuration parameters. As a result of determining the gaps, controller component 220*b* may output a delta object model 515 representative of these gaps between the begin and end states.

Controller component 220*b* may further execute a graph traversal algorithm for determining an appropriate or proper workflow of operations 517 for deploying (or updating) software resources described in delta object model 515, i.e., allow state transitions to be executed, from one state to another. For example, delta object model 515 may holds objects representing instances of elementary components (i.e., previously-described component/blend descriptors) of the 5GC network, with a certain state and certain constraints (instantiated in component instances). The state may be, for instance, "idle" for a new component instance that must be deployed, "decommissioned" for an old component instance that must be removed, or some "synchronize" state for a component instance whose configuration must be modified, or whose version must be upgraded. Descriptors can also define "methods" for operating instances of an associated component, such as "configure," "deploy," "wipe," etc. which allow for modification of the state of the component instance to which they are applied. The life-cycle of a component instance can be modeled by a generic state machine (the same applies to all components) with some stable states like "up & running" and "terminated" and some transient states like the previously-mentioned states, e.g., "idle," "decommissioned," "synchronize," etc. Thus, graph traversal, as utilized in various examples, can amount to finding a way to bring all the objects of delta model 515 (whose state is initially transient) into a stable state, by applying some methods while respecting the constraints that apply to each component instance. This resulting flow of methods can be referred to as a deployment workflow (the outcome of the graph traversal algorithm), an example of which is workflow of operations 517. It should be noted that the workflow of operations 517 determined by controller component 220*b* should also satisfy any constraints set forth in the component and blend descriptors 500. It should be understood that in some scenarios, cross-vendor fabric 220 may report that no workflow is possible, for instance, in a case where erroneous cyclic dependencies exist between certain resources or aspects a deployment.

Once a workflow of operations, e.g., workflow 517, has been determined, engine component 220*c* of cross-vendor fabric 200 may then, actually deploy/perform deployment operations at 518 to execute the computed deployment workflow of operations 517.

FIG. 6 illustrates an example computing component that may be used to implement network slice orchestration/deployment in accordance with various examples of the disclosed technology. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for burst preloading for available bandwidth estimation. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to receive a request to perform an operation on a network. It should be understood that operational requests can range from deployment of a network slice to updating some network slice component to ending a deployment (undeploying a network slice). It should be noted that instruction 606 may be embodied by instruction 610 (described below). That is, the pushing of descriptors to the cross-vendor fabric can represent the request for an operation to be performed on a network.

Hardware processor 602, which may be a processor of a CSP platform, such as CSP platform 200, a controller or other function of cross vendor-fabric 220, etc. may execute instruction 608 to receive deployment-independent descriptors indicative of components of a network associated with performance of the operation. Again, as noted above, components can refer to elemental aspects of, e.g., software, for performance of an operation, deployment of the software (for performing the operation or which may be the operation itself, etc.). Such descriptors can include the aforementioned component and blend descriptors which contain or include information regarding a component (such as a resource that can be used to effectuate an NF associated with a network slice to be deployed), e.g., its configuration parameters, its relationship with other components, the methods for configuring or deploying the component, etc. Such descriptors can also include blend descriptors that characterize an aggregation of two or more components, or an aggregation of two or more blend descriptors. Both blend and component descriptors are independent from or agnostic as to the nature or topology of any particular network/system deployment. That is, the information characterizing the components/blends does not contain or include information specific to any deployment.

Hardware processor 602 may execute instruction 610 to obtain deployment-specific descriptors comprising a plurality of the deployment-independent descriptors and relationships between the plurality of deployment-independent descriptors. As described above, layout and settings descriptors can be generated by an orchestration component, e.g., orchestration component 206, or a CI/CD pipeline, e.g., CI/CD pipeline 404. Layout descriptors include information used for instantiating relevant components and component blends. Settings descriptors may provide information/characteristics that configure the component and blend instances that are defined by an appropriate layout descriptor(s). It should be understood that the layout and settings descriptors are specific to a customer or deployment (per a network slice). In some examples, begin state and end state layout/settings descriptors can be generated and processed to determine begin and end object models.

Hardware processor 602 may execute instruction 612 to generate a workflow from the deployment-specific descriptors to perform the requested operation. That is, and as explained above, begin and end state object models may have been generated by cross-vendor fabric 220. Upon application of a diff algorithm to the begin and end state object models, a delta object model may be determined. A controller component of cross-vendor fabric may then compute the workflow of operations needed to satisfy or achieve the requested operation by performing a graph traversal operation on the delta object model.

Hardware processor 604 may execute instruction 614 to deploy or perform the workflow on the network. It should be understood that an engine component of cross-vendor fabric 220 may perform the actual deployment. The network may comprise a cluster of containerized NFs.

Figure 7:
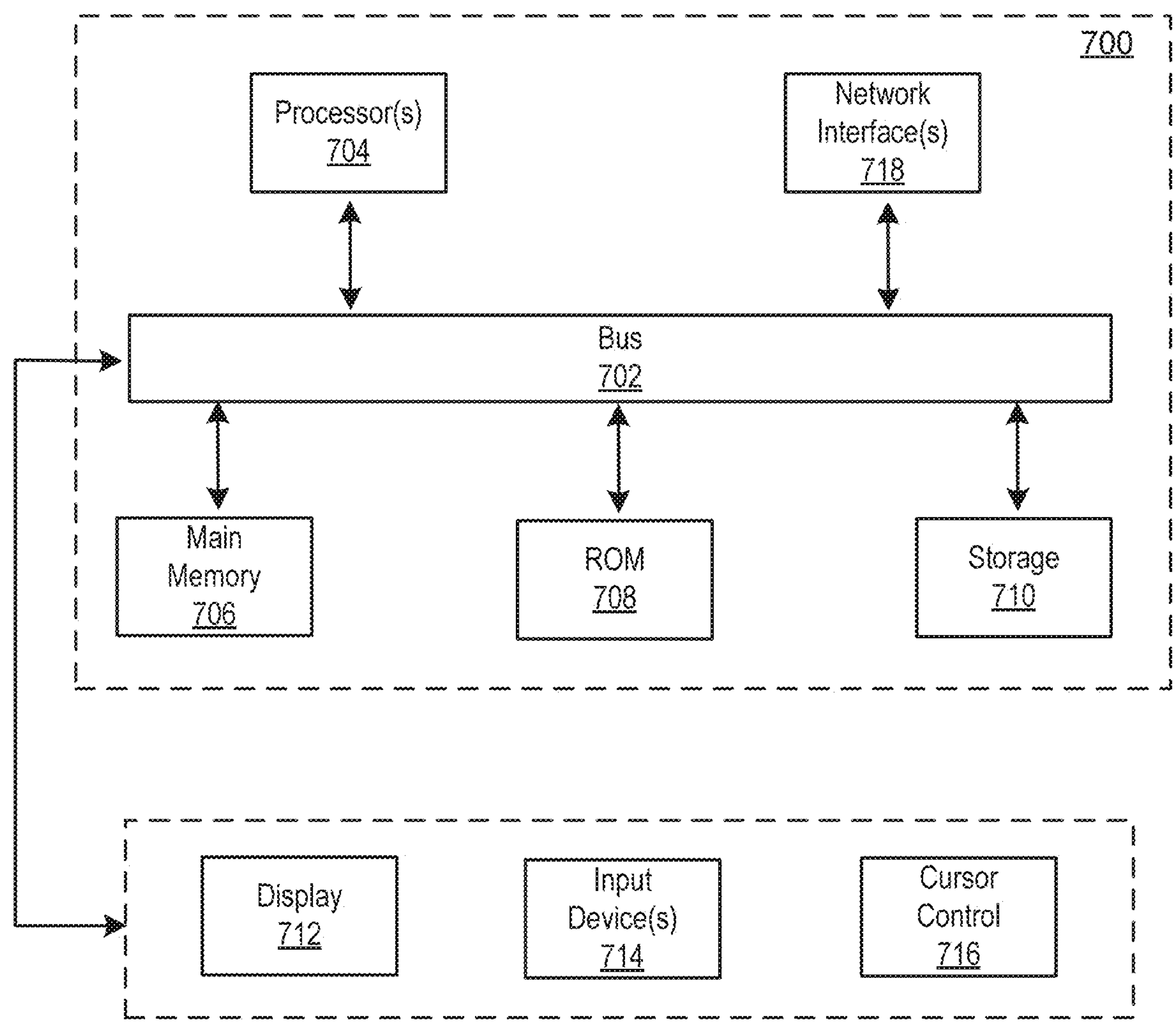
FIG. 7 is an example computing component that may be used to implement various features of examples of the disclosed technology.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

receiving a request to perform an operation on a network;

receiving deployment-independent descriptors indicative of components of the network associated with performance of the operation, wherein the deployment-independent descriptors include blend descriptors, and the blend descriptors do not include information specific to a deployment of the operation;

obtaining deployment-specific descriptors comprising a plurality of the deployment-independent descriptors and relationships between the plurality of the deployment-independent descriptors, wherein the deployment-specific descriptors include layout and settings descriptors specific to the deployment of the operation;

generating a workflow from the deployment-specific descriptors to perform the requested operation; and performing the workflow on the network.

2. The method of claim 1, wherein the network provides services via a network slice, and wherein the deployment-independent descriptors are representative of the network slice.

3. The method of claim 2, wherein the components of the network are instantiated as network functions on the network slice.

4. The method of claim 1, wherein the deployment-independent descriptors comprise component descriptors describing the components, and blend descriptors describing an aggregation of at least one of multiple components and multiple blends.

5. The method of claim 4, wherein the obtaining of the deployment-specific descriptors comprises obtaining the deployment-specific descriptors from a continuous integration/continuous deployment (CI/CD) pipeline of the network configured to automatically generate the deployment-specific descriptors.

6. The method of claim 4, wherein the deployment-specific descriptors comprise layout descriptors associated with instances of at least one of the blend descriptors and component descriptors to be deployed, the blend descriptors corresponding to the deployment-independent descriptors.

7. The method of claim 6, wherein the deployment-specific descriptors further comprise settings descriptors comprising network configuration parameters and data for the instances of the component descriptors and the blend descriptors.

8. The method of claim 1, wherein generating the workflow comprises analyzing begin and end states associated with the deployment-independent descriptors.

9. The method of claim 8, wherein generating the workflow further comprises determining a differential between the begin and end states.

10. The method of claim 9, wherein generating the workflow further comprises generating an object model representative of the differential, and applying a graph traversal algorithm to the object model.

11. The method of claim 1, wherein the method is performed by a cross-vendor fabric comprising a controller and an engine, wherein the controller performs the generating of the workflow, and wherein the engine performs the workflow.

12. A cross-vendor fabric, comprising:

a processor; and a memory including computer code that when executed, causes the processor to:

receive deployment-independent descriptors indicative of components of a network or groups of components of the network to be deployed or managed on a network slice, wherein the deployment-independent descriptors include blend descriptors, and the blend descriptors do not include information specific to a deployment of a workflow;

obtain deployment-specific descriptors based on the deployment-independent descriptors, wherein the deployment-specific descriptors include layout and settings descriptors specific to the deployment of the workflow;

generate the workflow from the deployment-specific descriptors to effectuate the deployment or the management of the components or groups of components of the network; and execute the deployment or the management of the components or groups of components of the network.

13. The cross-vendor fabric of claim 12, wherein the network slice comprises a plurality of network functions, and wherein at least two network functions of the plurality of network functions are associated with different vendors requiring at least one of different operating conditions or configurations.

14. The cross-vendor fabric of claim 12, wherein the obtaining of the deployment-specific descriptors comprises obtaining the deployment-specific descriptors from a continuous integration/continuous deployment (CI/CD) pipeline of the network configured to automatically generate the deployment-specific descriptors.

15. The cross-vendor fabric of claim 12, wherein generating the workflow comprises analyzing begin and end states associated with the deployment-independent descriptors, and developing begin state and end state object models representative of the begin and end states.

16. The cross-vendor fabric of claim 15, comprising a Kubernetes Operator software development kit or a self-contained service monitoring changes to the deployment-independent descriptors and to the deployment-specific descriptors to determine the end state.

17. The cross-vendor fabric of claim 15, wherein generating the workflow further comprises determining a differential between the begin and end state object models using a diff algorithm, and developing a delta object model representative of the differential.

18. The cross-vendor fabric of claim 17, wherein generating the workflow further comprises applying a graph traversal algorithm to the delta object model.

19. A system, comprising:

a processor; and a memory including computer code that when executed, causes the processor to:

on-board, to a cross-vendor fabric, component descriptors and blend descriptors describing network components and groups of network components, respectively, wherein the blend descriptors do not include information specific to a deployment of an operation;

obtaining layout and settings descriptors that reflect deployment-specific operating considerations relevant to the component descriptors and the blend descriptors, wherein the layout and settings descriptors are specific to the deployment of the operation;

based on the layout and settings descriptors, computing, by the cross-vendor fabric, a workflow of operations to be performed to deploy or modify operation of the at least one of the network components and groups of network components on a network slice; and perform the workflow of operations.

20. The system of claim 19, wherein the network slice comprises a plurality of network functions, and wherein at least two network functions of the plurality of network functions are associated with different vendors requiring at least one of different operating conditions or configurations relevant to the at least one of the network components and groups of network components.

* * * * *